loosely receiving the corresponding one of said bolts, so that said clamps may slide longitudinally of said bolts and tilt at an angle thereto under the forces of impacts upon said bumper bar, and a spring for yieldingly resisting both said sliding and tilting movements of said clamps.

6. A vehicle bumper comprising brackets to be mounted upon a vehicle, each including a substantially right angular body and a pair of plates each secured at one end to one side of said body and formed at its other end to be attached to one side of a side bar of an automobile chassis with one arm of said angular body in substantially vertical depending position, a bolt mounted in and projecting from said depending portion between said plates, a bumper bar, a pair of clamps each connected to said bumper bar and having an angular portion formed with a slot intermediate its ends loosely receiving the corresponding one of said bolts so that said clamps may slide longitudinally of said bolts and tilt at an angle thereto under the forces of impacts upon said bumper bar, said bolts having abutments or heads thereon in spaced relation to said depending portions of said bodies of the brackets, and a helical compression spring on each of said bolts between said angular portion of the corresponding clamp and said abutment to yieldingly resist both said sliding and tilting movements of said clamps.

FRANCESCO RENZULLI.

March 22, 1927.
T. H. RHOADS
1,622,051
PROCESS OF DRYING TANK BLOCKS
Filed June 3, 1924
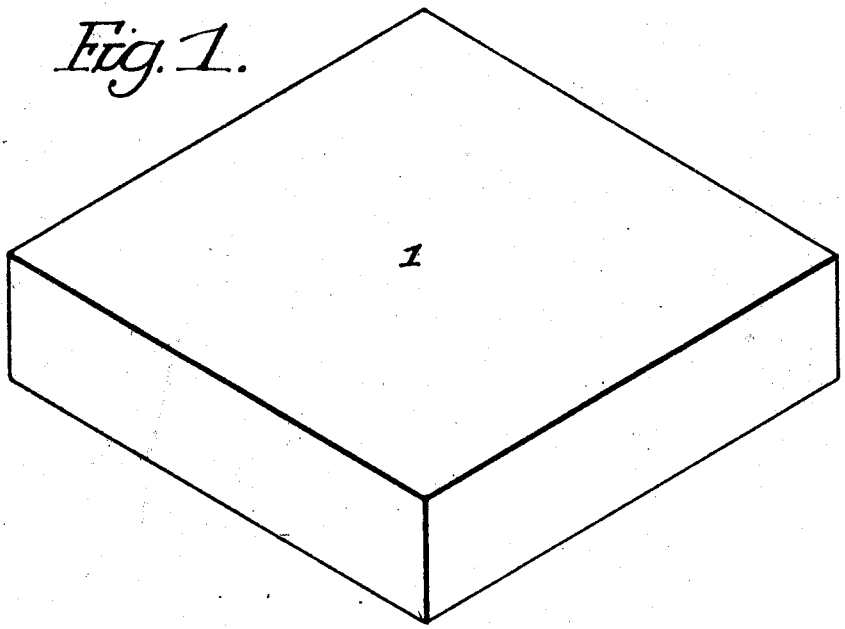
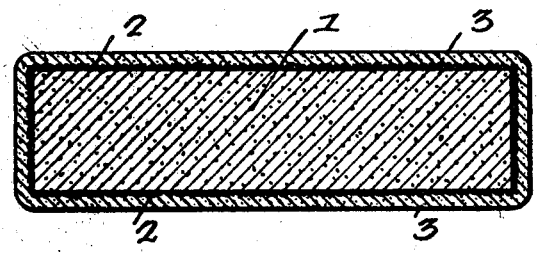
Inventor:
Thomas H. Rhoads
by his Attorneys